(12) United States Patent
Muratov et al.

(10) Patent No.: US 9,818,530 B2
(45) Date of Patent: Nov. 14, 2017

(54) ADAPTIVE WIRELESS POWER TRANSFER SYSTEM AND METHOD

(71) Applicant: TEXAS INSTRUMENTS INCORPORATED, Dallas, TX (US)

(72) Inventors: Vladimir Alexander Muratov, Manchester, NH (US); Eric Gregory Oettinger, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 848 days.

(21) Appl. No.: 13/743,027

(22) Filed: Jan. 16, 2013

(65) Prior Publication Data

US 2013/0181539 A1 Jul. 18, 2013

Related U.S. Application Data

(60) Provisional application No. 61/587,488, filed on Jan. 17, 2012.

(51) Int. Cl.

| | |
|---|---|
| *H01F 27/42* | (2006.01) |
| *H01F 37/00* | (2006.01) |
| *H01F 38/00* | (2006.01) |
| *H01F 38/14* | (2006.01) |
| *H02J 7/02* | (2016.01) |
| *H02J 5/00* | (2016.01) |
| *H02J 17/00* | (2006.01) |

(52) U.S. Cl.
CPC .............. *H01F 38/14* (2013.01); *H02J 5/005* (2013.01); *H02J 7/025* (2013.01); *H02J 17/00* (2013.01)

(58) Field of Classification Search
CPC . H02J 17/00; H02J 7/025; H02J 5/005; B60L 11/182; H01F 38/14
USPC .... 307/104, 9.1, 10.1, 149, 66, 64; 455/522, 455/88; 320/134
See application file for complete search history.

(56) References Cited

U.S. PATENT DOCUMENTS

| | | | |
|---|---|---|---|
| 6,072,990 A * | 6/2000 | Agrawal | H04W 52/30 455/522 |
| 2010/0198420 A1* | 8/2010 | Rettger | G01W 1/10 700/291 |
| 2012/0032645 A1* | 2/2012 | Matsuura | H02J 7/0031 320/134 |

(Continued)

*Primary Examiner* — Rexford Barnie
*Assistant Examiner* — Jagdeep Dhillon
(74) *Attorney, Agent, or Firm* — William B. Kempler; Charles A. Brill; Frank D. Cimino (57) ABSTRACT

A system for wireless power transfer is provided. The system includes a monitoring function to monitor control parameters and an input source that supplies power to a wireless power transmitter, wherein the wireless power transmitter operates with a wireless power receiver to supply a charging current to a load. A controller can be configured to receive the control parameters from the monitoring function and to control an adjustable operating point for the wireless power transmitter which controls the charging current delivered to the load via the wireless power receiver, wherein the controller commands a maximum power operating point for the wireless power transmitter when the input source is detected at or above a predetermined threshold and commands a reduced power operating point for the wireless power transmitter when the input source to the wireless power transmitter is detected below the predetermined threshold.

20 Claims, 8 Drawing Sheets

(56) References Cited

U.S. PATENT DOCUMENTS

| | | | |
|---|---|---|---|
| 2012/0080944 A1* | 4/2012 | Recker | H02J 9/02 307/25 |
| 2012/0145782 A1* | 6/2012 | Ma | G07F 19/209 235/379 |
| 2012/0256494 A1* | 10/2012 | Kesler | H03H 7/40 307/104 |

* cited by examiner

ADAPTIVE WIRELESS POWER TRANSFER SYSTEM AND METHOD

CROSS-REFERENCE TO RELATED APPLICATION

This application claims the benefit of U.S. Provisional Patent Application 61/587,488 filed on Jan. 17, 2012, and entitled WIRELESS POWER TRANSFER SYSTEM ADAPTIVE TO VARIABLE INPUT POWER SOURCE CAPABILITIES AND ASSOCIATED METHODS, the entirety of which is incorporated by reference herein.

TECHNICAL FIELD

This disclosure relates to power transfer, and more particularly to adaptive wireless power transfer systems and methods.

BACKGROUND

Wireless power transfer systems typically include primary side transmitters and secondary side receivers and are employed to transfer power wirelessly over an isolation barrier to facilitate a convenient mode for powering or charging batteries of mobile devices. Mobile devices can include cell phones, tablet PCs, digital cameras, medical electronic implants, industrial equipment, or medical equipment where having direct electrical contacts to supply power to the device is not desirable.

The most common system for wireless power transmission is via induction methods wherein a transformer is employed to transfer power from a primary side winding to a secondary side winding over an isolation barrier in the transformer. Thus, in a battery charging application, a charging pad may be employed to allow a mobile device such as a cell phone to receive its charge when placed near the charging pad. The mobile device can be connected to the secondary winding and receive its power wirelessly from the primary winding which can in turn be powered from a wall outlet for example. This allows the mobile device to be charged without being directly plugged into a power source which offers great convenience to the user.

Unfortunately, power sources that power the primary side of the wireless power system are highly variable and offer variable amounts of power. For example, a wall adapter may be able to deliver substantially more power that a universal serial bus (USB) adapter. Current wireless power transfer systems will shut down if a minimum amount of input power is not available to the system. Shut down conditions provide no charging solution for the respective user. Other wireless power transfer systems (e.g., light energy transfer systems) may also suffer from similar sourcing problems.

SUMMARY

This disclosure relates to systems and methods for wireless power transfer. In one example, a system for wireless power transfer is provided. The system includes a monitoring function to monitor control parameters and an input source that supplies power to a wireless power transmitter, wherein the wireless power transmitter operates with a wireless power receiver to supply a charging current to a load. A controller can be configured to receive the control parameters from the monitoring function and to control an adjustable operating point for the wireless power transmitter which controls the charging current delivered to the load via the wireless power receiver, wherein the controller commands a maximum power operating point for the wireless power transmitter when the input source is detected at or above a predetermined threshold and commands a reduced power operating point for the wireless power transmitter when the input source to the wireless power transmitter is detected below the predetermined threshold.

In another example, a method includes monitoring a control parameter for a variable input power source that supplies power in a wireless power transfer system. The method includes determining input power capabilities of the variable input power source by comparing the control parameter to a threshold. This includes adjusting a power set point for the wireless power transfer system based on the determined input power capabilities of the variable input power source, wherein the power set point is reduced when the variable input power source is determined to have limited power capabilities.

In yet another example, an integrated circuit includes a controller configured to monitor control parameters from a wireless power system and to monitor an input source to control an adjustable operating point for the wireless power system to control a charging current delivered to a load, wherein the controller commands a maximum power operating point for the wireless power system when the input source is detected at or above a predetermined threshold and commands a reduced power operating point for the wireless power system when the input source is detected below the predetermined threshold. The integrated circuit includes an input circuit to provide the control parameters to the controller. This includes a lower power circuit to indicate the input source has a reduced power delivery capacity.

DETAILED DESCRIPTION

Figure 1:
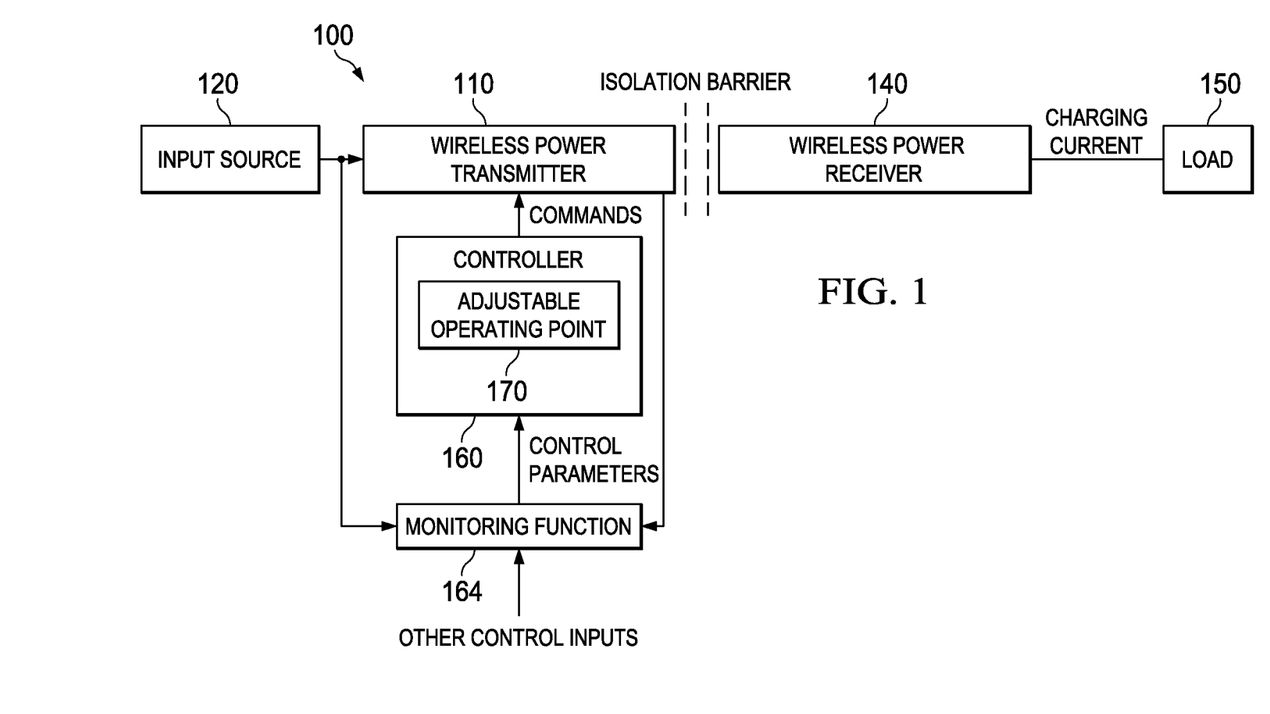
FIG. 1 illustrates a wireless power transfer system having an adjustable operating point to accommodate variable input source capabilities.

FIG. 1 illustrates a wireless power transfer system 100 having an adjustable operating point to accommodate variable input source capabilities. In one example, the system 100 can be provided as a circuit (e.g., integrated circuit, discrete circuit, combination of integrated circuit and discrete circuits) for wireless power transfer. The system 100 includes a wireless power transmitter 110 that is coupled to an input source 120 (e.g., voltage and current source) to supply power to a wireless power receiver 140. The wireless power transmitter 110 operates with the wireless power receiver 140 to supply a charging current to a load 150. As shown, an isolation barrier exists between the wireless power transmitter 110 and the wireless power receiver 140. In one example, a transformer can provide the isolation barrier, wherein a primary winding is associated with the wireless power transmitter 110 and a secondary winding is associated with the wireless power receiver 140, wherein each of the windings is separated by the isolation barrier. Other forms of wireless power transmission are possible than the example induction methods described herein. The wireless power receiver 140 can also include regulation circuits for supplying the charging current to the load 150.

A controller 160 can be configured to monitor control parameters from the wireless power transmitter 110, to monitor the input source 120, and other control inputs via a monitoring function 164 (e.g., monitoring A/D input in the controller, external monitoring circuit providing input to the controller). The monitoring function 164 can be an internal operation in the controller such as from an analog to digital converter (ADC) input and/or provided as part of an external circuit to the controller. Based on such monitoring via the monitoring function 164, the controller 160 can control an adjustable operating point 170 for the wireless power transmitter 110 to control the charging current delivered to the load 150 via the wireless power receiver 140. As shown, the adjustable operating point 170 is communicated via commands (e.g., voltage, current, and/or frequency commands) sent to wireless power transmitter 110. The controller 160 sends the commands that set a maximum power operating point for the wireless power transmitter 110 when the input source 120 is detected above a predetermined threshold such as the case when the input source can deliver full power to the load. The controller 160 sends commands for a reduced power operating point for the wireless power transmitter 110 when the input source 120 to the wireless power transmitter is detected below the predetermined threshold such as the case when an adequate supply voltage is detected from a source having limited current capability.

The ability to continue wireless power transfer at reduced input voltages or currents by the system 100 advantageously allows charging operations which were not possible with conventional charging systems (or a combination of charging systems). For example, a conventional wireless transfer system that was designed to deliver power from a wall adapter as its input source would shut down if a lower power input source were used such as a USB input source. In contrast, the system 100 overcomes such deficiencies by monitoring input conditions and automatically adjusting power transfer to the load in view of available input supply capabilities. This includes delivering a reduced amount of power to the load over time without completely shutting down which still provides charging capability for the user. In this manner, even if the input source 120 is configured to provide power that is less than what is typically required by the load 150, the controller 160 can still operate the wireless power transmitter 110 in a reduced power capacity yet still continue deliver power to the load rather than completely shutting down. Such reduced power delivery can include reduced voltage delivery to the wireless power receiver 140, reduced current delivery to the wireless power receiver, or a combination of reduced voltage and reduced current.

As shown, feedback can be provided to the monitor circuit 164 in several forms which in turn can be used by the controller 170 to change the adjustable operating point 170. In one example, the wireless power transmitter 110 can receive modulated information from the wireless power receiver 140 indicating load requirements and/or other conditions (e.g., fault conditions). Feedback can also include monitoring input source conditions such as voltage and current capabilities of the input source 120. Other control inputs to the monitor circuit 164 could include explicit control inputs such as received from the input source 120 indicating it had less than full power capabilities. The other control inputs could also include frequency inputs (e.g., indicating switching frequency conditions) and temperature inputs. Thus, in one example, if the load requirements as requested by the modulated feedback from the receiver 140 are greater than the capabilities than can be provided by the input source 120, the controller 160 can utilize the adjustable operating point 170 to command the wireless power transmitter 110 to decrease its supply of power to the wireless power receiver 140. This enables a reduced amount of power to be delivered to the load 150 yet not shutting the system 100 down due to an overload condition of the input source 120. This reduced power operation to the load can enable a slow-charge condition, where a battery can still charge yet over a longer period of time.

As used herein, the term controller can be a processor operating firmware to control operation of the wireless power transmitter 110. In another example, the controller 160 could be a hard-wired function wherein dedicated logic and switching elements control the wireless power transmitter 110. In yet another example, a combination of programmed elements and circuit logic elements could cooperate to perform the operation of the controller 160.

It is noted that the examples described herein can be provided via different analog and/or digital circuit implementations. For instance, in some cases, field effect transistors can be employed and in other cases junction transistors or diodes employed. Some control components can be employed as discrete implementations such as a comparator comparing a reference signal to a control signal and in other examples, controllers operating via processor instructions and exchanging data via D/A and A/D converters could be employed to monitor control parameters and generate control signals and commands within the circuit 100.

To describe but a few application examples for the system 100, wirelessly powered mobile devices may have increased utility when capable of operating from a variety of input power sources 120 having the same voltage level but different current capability. For example, a mobile phone wireless charging pad (WCP) can be normally powered from an input source 120 such as a wall adapter with an adequate power rating (e.g., 5.0V @ 1.5 A). At the same time, it would be desirable that the same WCP operate when powered from a USB port (5.0V @ 0.5 A) or input sources 120 that harvest electrical energy from renewable energy sources such as solar panels or thermal generators, for example. Thus, delivering reduced power to the secondary side is considered a better alternative to providing no power at all.

A typical USB port normally provides substantially lower output power (2.5 W) than the wall adapter (7.5 W) while both have the same output voltage level. For current wireless delivery systems, this can present a problem as the WCP has no means of communicating to the receiver of the wireless power system that it is operating from a source with limited power. If the secondary side of system in a current system attempts to draw its nominal load current while the input is limited, it may trip the input source overload protection and collapse the power transfer. This may result in a non-satisfactory user experience with the wireless power transfer. The system 100 solves such existing problems by utilizing the adjustable operating point 170 and controller 160 to deliver power in a reduced power condition while not tripping an overload condition due to reduced capabilities of the input source 120.

The system 100 can employ various means of monitoring electrical parameters such as voltage and current from the input source 120 via the monitoring function 164. It can also employ a microcontroller or other control circuitry capable of digitizing these parameters, storing digital interpretations of these parameters in its memory, and associating acquired values with events in the wireless transfer operation. This includes performing logical and arithmetical operations with the acquired values, and actively changing the operating point of the system 100 in a manner that allows the system to operate steadily delivering partial power to the load 150 and depending on the available power rating of the input source 120.

In one example, the controller 160 monitors the input voltage for falling below to some predetermined level or threshold, a (e.g., a Not-to-Exceed Operating Point). When this point is reached, feedback commands from the receiver to increase the output power can be ignored and the controller 160 notes the input current, operating frequency and/or any other parameters related to the operating point associated with the Not-to-Exceed Operating Point. At this point, the controller can decrease its supply of current to the load (e.g., by increasing switching frequency) which enables the input source voltage to again rise from the overload condition. At this new voltage operating point which is above the not-to-exceed point, the controller can then regulate around a desired current to maintain some amount of power delivery to the load.

After these measurements are recorded at the threshold and provided by the monitoring function 164, the controller 160 regulates the operating point parameters in a manner to provide a predetermined safety margin between the current operating point and the Not-to-Exceed Operating Point. In a frequency controlled wireless power transfer system, the operating frequency may be kept above the frequency noted at the Not-to-Exceed operating point, for example. In a voltage/current controlled wireless power transfer system, the voltage can be maintained above and the current can be maintained below the voltage and current detected at the Not-to-Exceed Operating Point.

In another example, a secondary regulation point can be set by the controller 160. For instance, when the Not-to-Exceed Operating Point is reached, the controller 160 temporarily regulates the output commands to reduce load current and enable the input voltage to rise to some new threshold greater than the Not-to-Exceed Operating Point, but less than the nominal system operating point. At this intermediate point, similar parameters as frequency, voltage, temperature, and/or current can be sampled and a new control set point for voltage and current can be maintained at the intermediate point. A more detailed discussion for adjusting the threshold and controlling new operating points is provided in accordance with the method relating to FIG. 9. If the Not-to-Exceed Operating Point is never reached, no alterations are made to the normal operating algorithm. If such threshold is reached, a special indication (e.g., led flashing) can be provided for the end user that the controller 160 is exercising input power limiting in its control loop.

Feedback commands from the receiver prompting a reduction of the output power can be permitted and followed. Optionally, the request for less power can be used to restore the indication of normal operation on the transmitter. If permitted, the system 100 can resume its normal charging indication scheme after a large load condition has passed. This could occur for instance when a phone call was made while the charging process was occurring. As will be shown and described below with respect to FIGS. 4 though 8, the controller 160 can effectively create a load line on the secondary side, wherein the output voltage is inversely proportional to the load current. The secondary side controller or charger (in the wireless power receiver) can utilize such load line to exercise a Dynamic Power Management process that limits load current based on a drop of the input voltage, for example.

Figure 2:
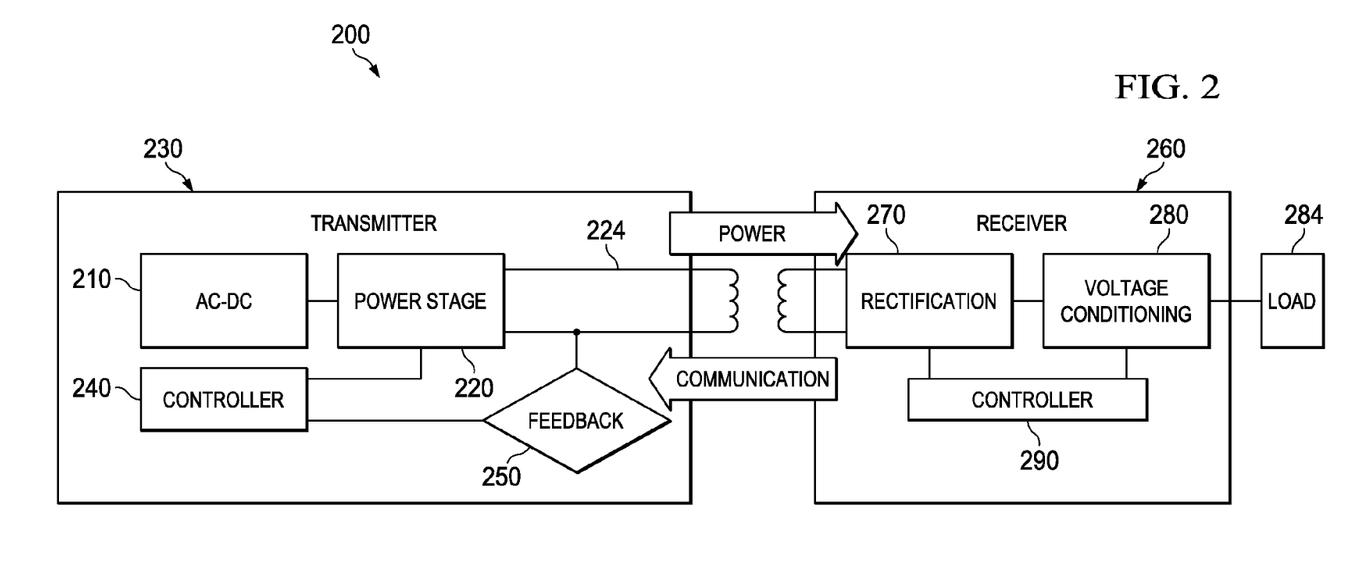
FIG. 2 illustrates an example wireless power transfer system having an adjustable operating point utilizing inductive power transfer and communications.

FIG. 2 illustrates an example wireless power transfer system 200 having an adjustable operating point utilizing inductive power transfer and communications. The system 200 can include an AC/DC input 210 to a power stage 220 that drives a primary coil 224 in a wireless power transmitter 230 (also referred to as transmitter). A controller 240 having an adjustable set point, processes feedback 250 from a wireless power receiver 260. The wireless power receiver 260 can include a rectification component 270 that drives a voltage conditioning block 280 connected to a load 284 and are each operated by a secondary controller 290.

An example aspect of wireless power transfer is to provide an open cored transformer consisting of primary and secondary coils and associated electronics as shown in the example system 200. The primary coil 224 and electronics are also referred to as the transmitter 230, and the secondary side the receiver 260. The transmitter coil and electronics are typically built into a charger pad. The receiver coil and electronics are typically built into a portable device, such as a cell-phone. When the receiver coil is positioned on the transmitter coil, magnetic coupling occurs when the transmitter coil is driven. The flux is coupled into the secondary coil which induces a voltage, current flows, where it is rectified, and power can be transferred effectively to a load—wirelessly. Power transfer can be managed via any of various closed-loop control methods (e.g., PID, threshold comparison/set point) which were described above with respect to FIG. 1.

In one example, communication within the system 200 can be from the receiver 260 to the transmitter 230, where the receiver commands the transmitter to send power and in what quantity. In order to regulate, the receiver 260 should communicate with the transmitter 230 whether to increase or decrease frequency (e.g., frequency controlling primary switching regulator). The receiver 260 monitors the rectifier 270 output and using Amplitude Modulation (AM), sends packets of information to the transmitter 230. A packet can include a preamble, a header, the actual message and a checksum, for example. The receiver 260 can send a packet by modulating an impedance network in one example. This AM signal reflects back as a change in the voltage amplitude on the transmitter coil 224. The signal can be demodulated and decoded by the transmitter side electronics and the frequency of its coil drive output is adjusted to close the regulation loop via the controller 240. The controller 240 can include internal digital demodulation circuitry. The modulated impedance network on the receiver 260 can be resistive or capacitive, for example.

Figure 3:
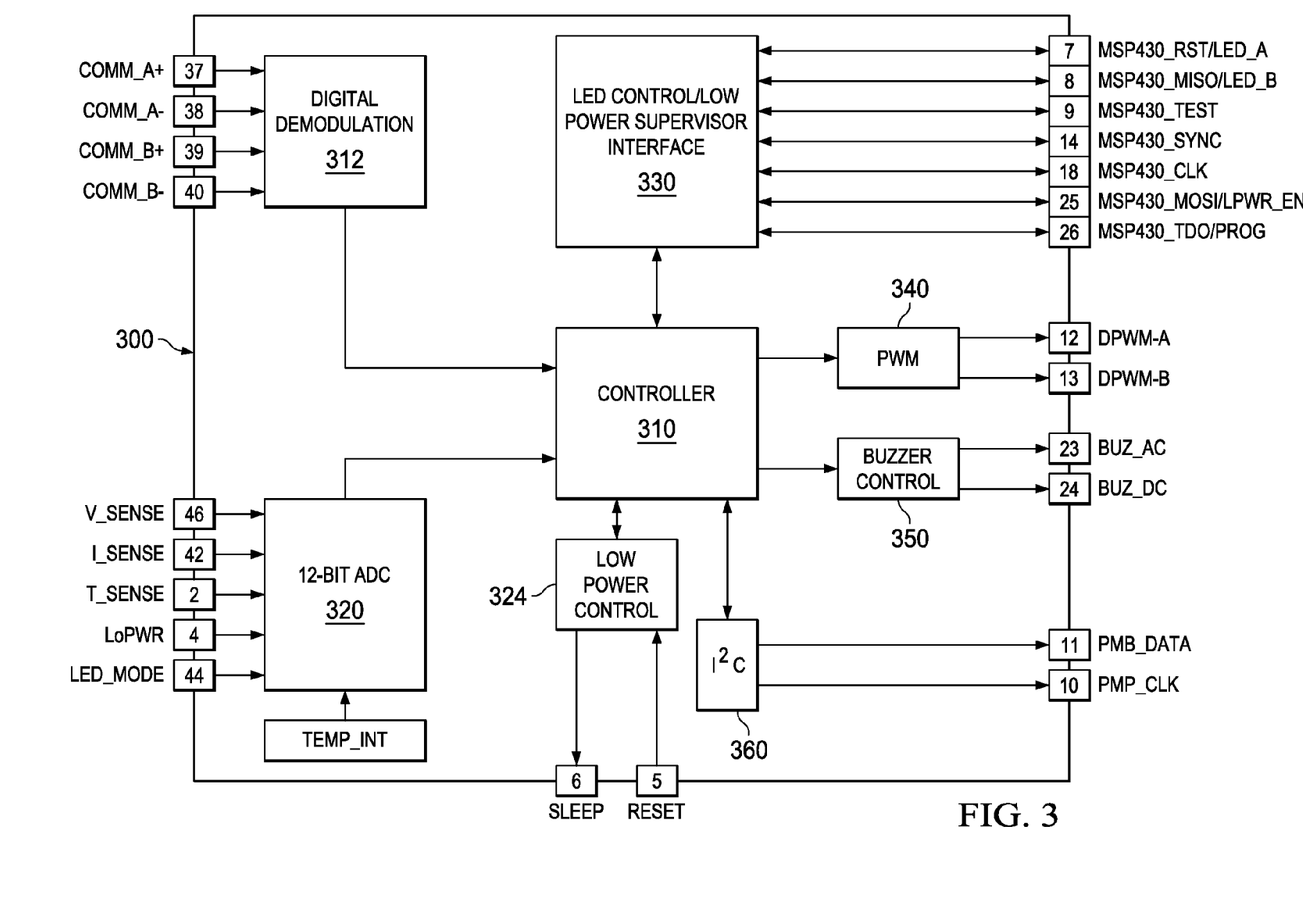
FIG. 3 illustrates an example controller integrated circuit (IC) that utilizes and adjustable operating point to accommodate variable input source capabilities.

FIG. 3 illustrates an example controller integrated circuit (IC) 300 that utilizes and adjustable operating point to accommodate variable input source capabilities. The IC 300 includes a controller 310 that receives communications input from a demodulation circuit 312 which receives communications inputs on pins 37 though 40 of the IC 300. A 12 bit ADC (or other resolution) processes various other inputs for the controller 310 including a voltage sense at pin 46, a current sense at pin 42, a temperature sense at pin 2, a low power sense at pin 4, and an LED mode input control at pin 44. The ADC 320 can also receive an internal temperature input as shown. A low power control circuit 324 supplies a lower power indicator to the controller 310, wherein the circuit 324 can be driven from a sleep mode pin at pin 6 and a reset mode pin at pin 5. Outputs from the controller 310 can include an LED and low power interface circuit which can drive various pin outputs such as reset LED, test, synchronize, clock, lower power mode, and program, for example. The controller 310 can also drive a pulse width modulator (PWM) circuit 340 which can be employed to drive a primary switching regulator as described above with respect to FIG. 1 via pins 12 and 13. Other outputs that can be driven from the controller 310 can include buzzer alarms via buzzer control and data/clock outputs via circuit 360.

The controller 310 provides dynamic power limiting (DPL) (also described as adjustable set point operation with respect to FIG. 1) which allows operation from a 5-V supply with limited current capability (such as a USB port) without causing a shutdown. There are various modes of operation that can be selected via an input pin selection on the IC 300. In the dynamic mode, when the input voltage is observed drooping, for example, the output power can be limited (e.g. via frequency command sent to primary switching regulator) to reduce the load and provide a margin relative to the supply's capability. As noted previously, additional thresholds can be monitored for additional margins of safety. A second mode, or constant current mode, can be provided for operation from an e.g., 500-mA capable USB port, wherein it restricts the output such that the input current remains below the 500-mA limit, for example.

Figure 4:
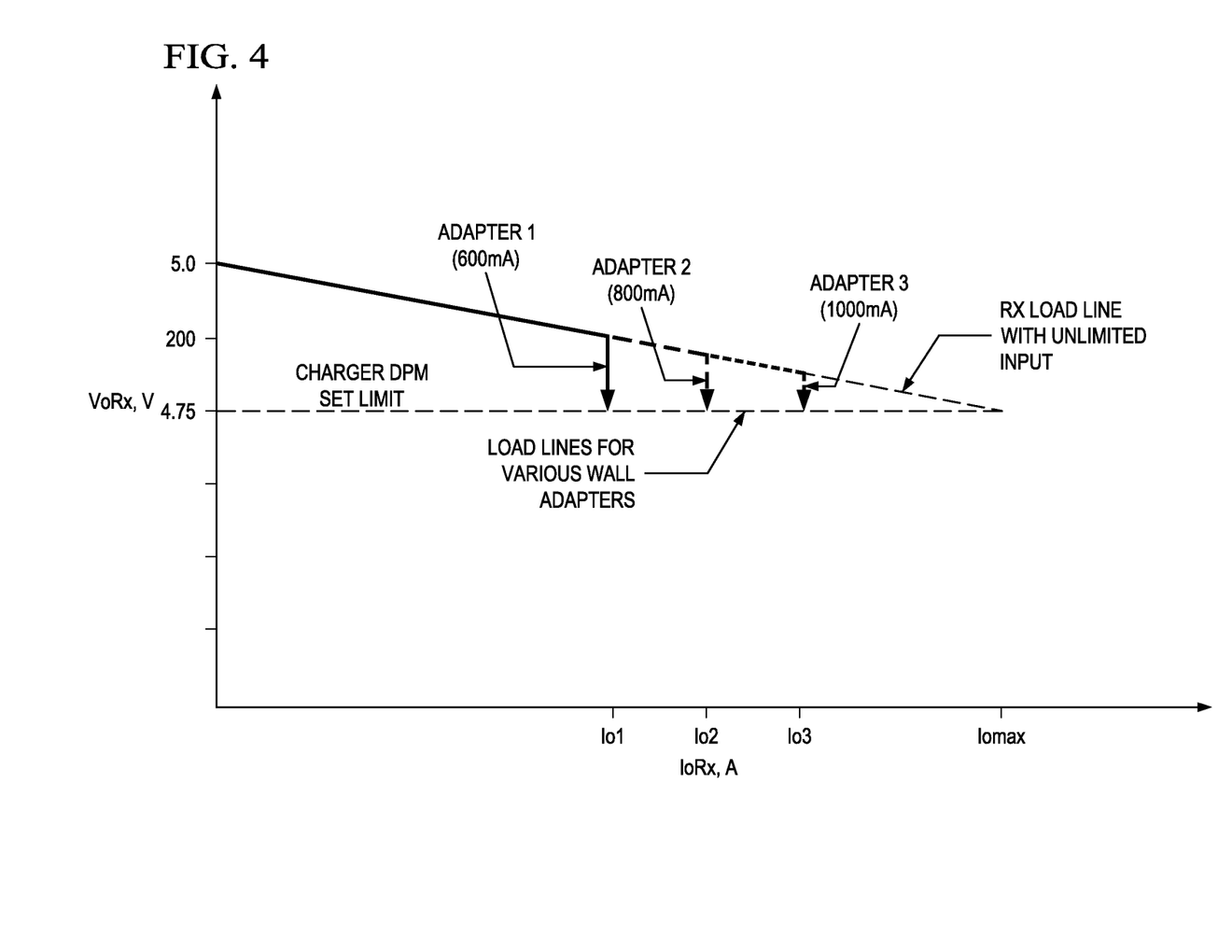
FIGS. 4-8 illustrate example graphs for controlling an operating point to accommodate variable input source capabilities.
Figure 5:
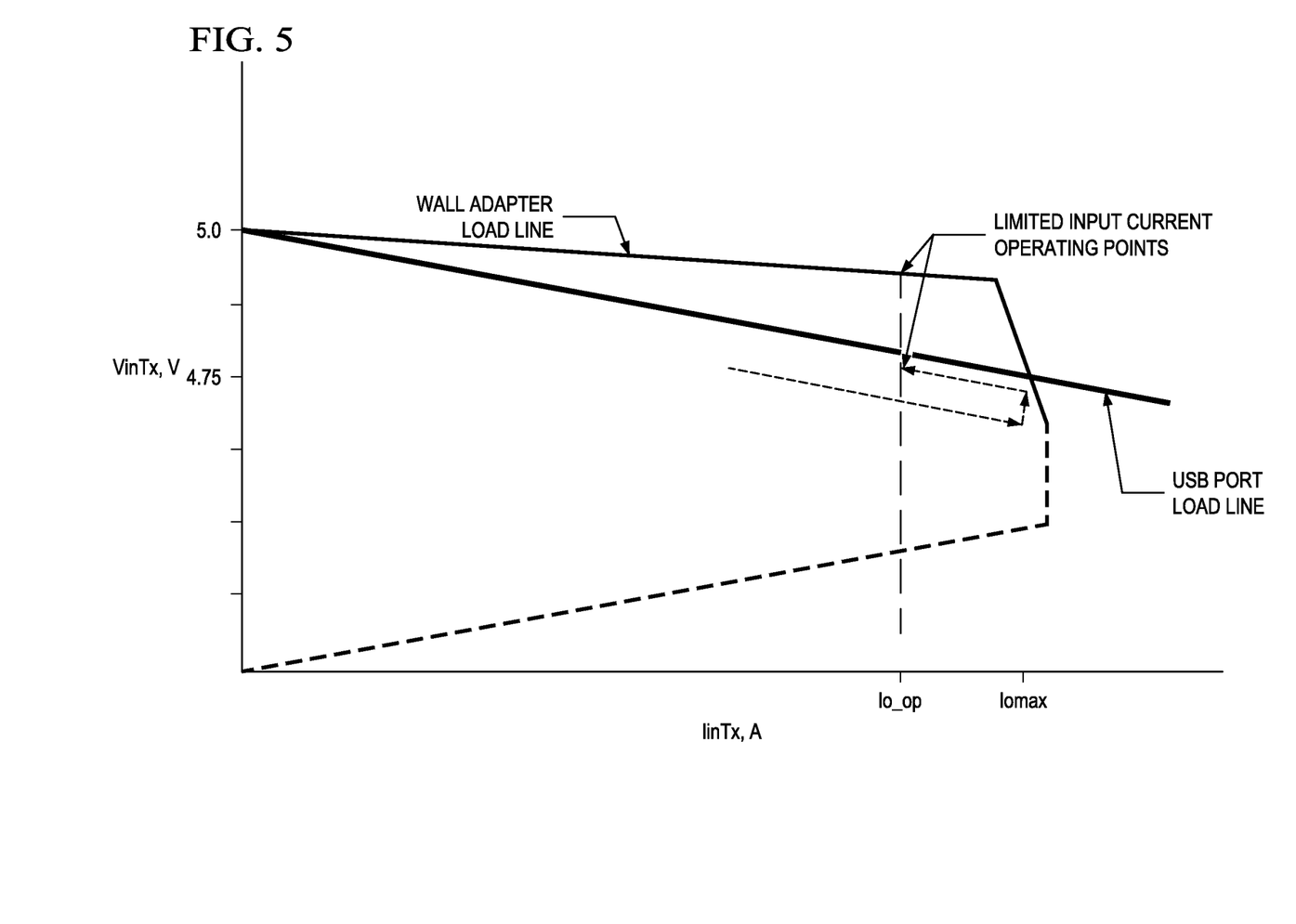
Figure 6:
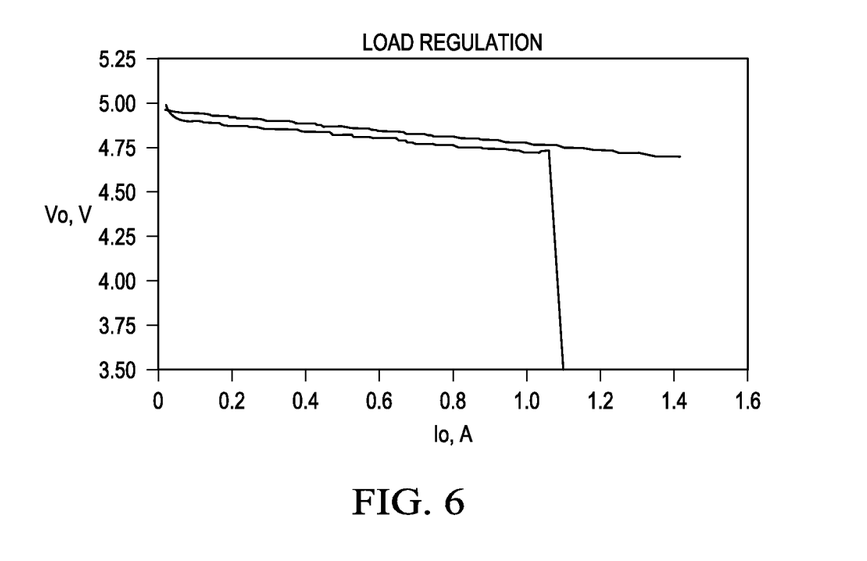
Figure 7:
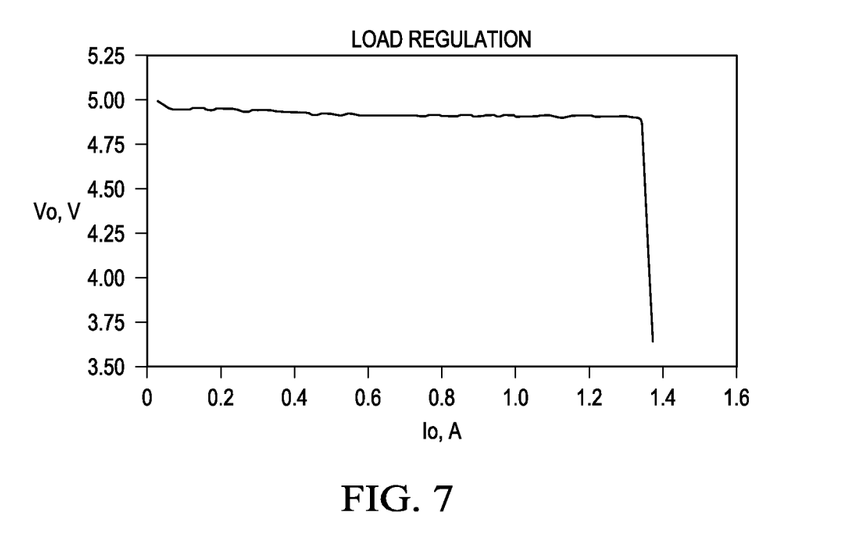
Figure 8:
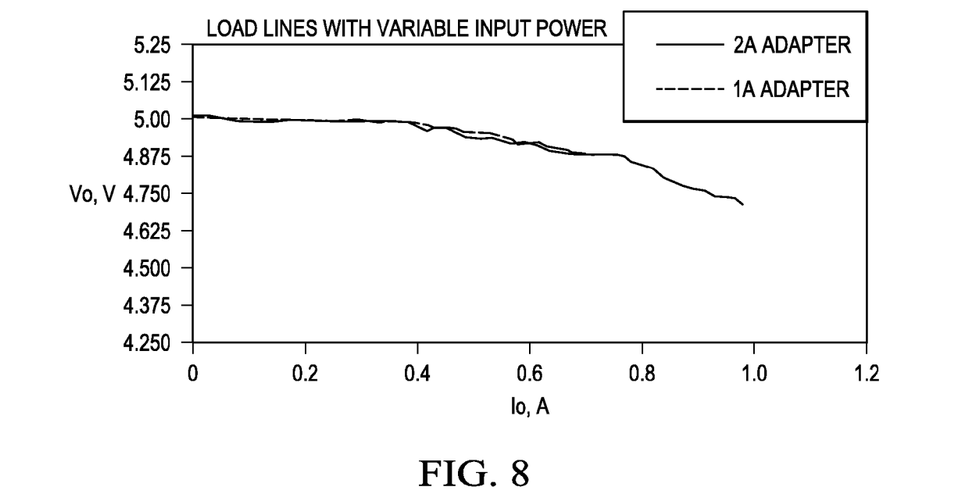

FIGS. 4-8 illustrate example graphs for controlling an operating point to accommodate variable input source capabilities. FIG. 4 illustrates example operating points of a wireless power transfer system powered by various sources with limited capabilities. In this example, a 600 mA source, an 800 mA source, and a 1000 mA source are shown operating along a receiver load line. Load lines for various wall adapters are shown below the receiver load lines. FIG. 5 shows a method of operating wireless power transfer system from limited power source by dynamically controlling the slope of the receiver load line. In this example, a USB load line is shown below a wall adapter load line, wherein the control methods described above are operative depending on type of input source supply utilized. FIGS. 6 and 7 illustrate two example load regulation graphs showing differing output characteristics for a USB wall adapter from two different manufacturers. FIG. 8 illustrates example experimental results for a wireless power transfer system having adjustable operating points based on input source conditions and operating from two different wall adapters, wherein the adapters have a difference of about two times in power rating. As shown the controller methods described herein provide similar load line characteristics even though the wall adapters are have substantially different power delivery capabilities.

Figure 9:
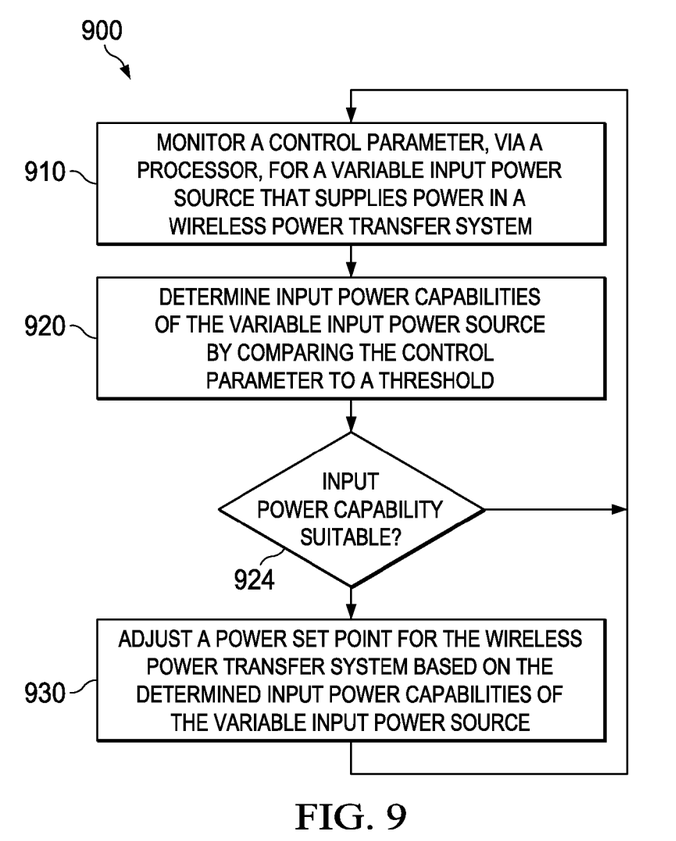
FIG. 9 illustrates an example method for wireless power transfer having variable input source capabilities.

In view of the foregoing structural and functional features described above, an example method will be better appreciated with reference to FIG. 9. While, for purposes of simplicity of explanation, the example method of FIG. 9 is shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method. The example method of FIG. 9 can be implemented as machine-readable instructions for a controller that can be stored in a non-transitory computer readable medium, such as can be computer program product or other form of memory storage. The computer readable instructions corresponding to the method of FIG. 9 can also be accessed from memory and be executed by a processor.

FIG. 9 illustrates an example method 900 for wireless power transfer having variable input source capabilities. At 910, the method 900 includes monitoring a control parameter (e.g., via monitor 164 of FIG. 1) for a variable input power source that supplies power in a wireless power transfer system. At 920, the method 900 includes determining input power capabilities of the variable input power source by comparing the control parameter to a threshold. At 924, the method 900 performs a decision wherein the control parameter is compared to the threshold which determines if the current input power conditions are suitable (e.g., input power adequate for load requirements). If the power capability is suitable at 924, the process proceeds back to 910 where control parameters are monitored. If the power capability is not suitable at 924, the process proceeds to 930. At 930, the method 900 includes adjusting a power set point for the wireless power transfer system (e.g., by controller 160 of FIG. 1) based on the determined input power capabilities of the variable input power source, wherein the power set point is reduced when the variable input power source is determined to have limited power capabilities.

Adjusting the power set point and operating points for adaptive power transfer can be achieved via various control methods. In one control method example, the input voltage can be monitored to detect when it drops below some threshold voltage such as voltage V_1. At that point, the controller can decrease the output power to regulate input voltage at a slightly higher voltage V_2. While regulating at voltage V_2, the controller can measure the associated current at V_2, which can be referred to as I_2. At this new voltage and current operating point, the controller can switch from voltage regulation to current regulation around the new current set-point of I_2. While regulating at I_2, the controller can monitor input voltage for subsequent drops below V_1 which is the not-to-exceed operating point described above. If the receiver should stop requesting more power than what can be delivered by the input source, the adaptive power limiting can cease and the system can return to its normal operating points.

Other aspects of the method 900 can include monitoring at least one of an input voltage level, an input current level, a switching frequency, a temperature input, feedback communicated from a wireless power receiver, and a control input indicating a low power condition, wherein the control parameter is utilized by the controller to adjust the power set point of the wireless power transfer system. This can include communicating load requirements that are analyzed with the control parameter to adjust the power set point. The method 900 can also include setting a not-to exceed threshold that determines a maximum amount of power that can be delivered by the wireless power transfer system. The method 900 can also include setting a secondary set point to provide an additional margin above the not-to exceed threshold.

Figure 10:
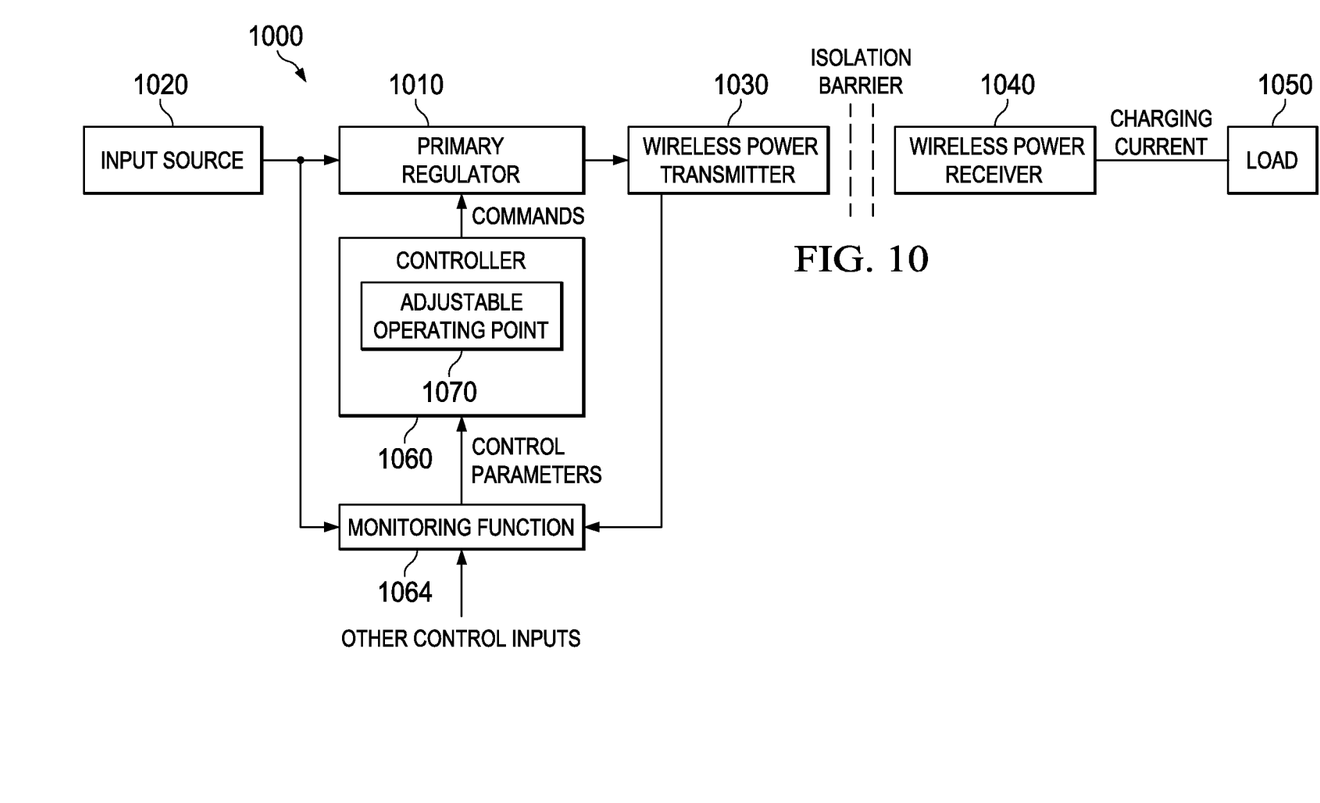
FIG. 10 illustrates an alternative example of a wireless power transfer system having an adjustable operating point to accommodate variable input source capabilities.

FIG. 10 illustrates an alternative example of a wireless power transfer system 1000 having an adjustable operating point to accommodate variable input source capabilities. In this example, the system 1000 can be provided as a circuit (e.g., integrated circuit, discrete circuit, combination of integrated circuit and discrete circuits) for wireless power transfer. The system 1000 can include a primary regulator 1010 that is coupled to an input source 1020 (e.g., voltage and current source) to supply power to a wireless power transmitter 1030. The wireless power transmitter 1030 operates with a wireless power receiver 1040 to supply a charging current to a load 1050. As shown, an isolation barrier exists between the wireless power transmitter 1030 and the wireless power receiver 1040. In one example, a transformer can provide the isolation barrier, wherein a primary winding is associated with the wireless power transmitter 1030 and a secondary winding is associated with the wireless power receiver 1040, wherein each of the windings is separated by the isolation barrier. Other forms of wireless power transmission are possible than the example induction methods described herein. The wireless power receiver 1040 can also include regulation circuits for supplying the charging current to the load 1050.

A controller 1060 can be configured to monitor control parameters from the wireless power transmitter 1030, to monitor the input source 1020, and other control inputs via a monitoring function 1064 (e.g., monitoring A/D input in the controller, external monitoring circuit). Based on such monitoring via the monitoring function 1064, the controller 1060 can control an adjustable operating point 1070 for the primary regulator 1010 to control the charging current delivered to the load 1050 via the wireless power receiver 1040. As shown, the adjustable operating point 1070 is communicated via commands sent to primary regulator 1010. The controller 1060 sends the commands that set a maximum power operating point for the primary regulator 1010 when the input source 1020 is detected above a predetermined threshold voltage. The controller 1060 sends commands for a reduced power operating point for the primary regulator 1010 when the input source 1020 to the primary regulator is detected below the predetermined threshold voltage. In this manner, even if the input source 1020 is configured to provide power that is less than what is typically required by the load 1050, the controller 1060 can still operate the primary regulator 1010 in a reduced power capacity yet still continue deliver power to the load rather than completely shutting down. Such reduced power delivery can include reduced voltage delivery to the wireless power receiver 1040, reduced current delivery to the wireless power receiver, or a combination of reduced voltage and reduced current.

As shown, feedback can be provided to the monitoring function 1064 in several forms which in turn can be used by the controller 1060 to change the adjustable operating point 1070. In one example, the wireless power transmitter 1030 can receive modulated information from the wireless power receiver 1040 indicating load requirements and/or other conditions (e.g., fault conditions). Feedback can also include monitoring input source conditions such as voltage and current levels of the input source 1020. Other control inputs to the monitoring function 1064 could include explicit control inputs such as received from the input source 1020 indicating it had less than full power capabilities. The other control inputs could also include frequency inputs (e.g., indicating switching frequency conditions) and temperature inputs. Thus, in one example, if the load requirements as provided by the modulated feedback from the receiver 1040 are greater than the capabilities of the input source 1020, the controller 1060 can utilize the adjustable operating point 1070 to command the primary regulator 1010 to decrease its supply of power to the wireless power transmitter 1030. This enables a reduced portion of power to be delivered to the load 1050 yet not shutting the system 1000 down as with conventional systems.

The primary regulator 1010 can be configured in different arrangements depending on the application. In one example, the primary regulator 1010 could be configured as a step-up or boost switching regulator that drives the wireless power transmitter 1030 with a switched AC waveform. In another example, the primary regulator 1010 could be configured as a step-down or buck switching regulator. As used herein, the term controller can be a processor operating firmware to control operation of the primary regulator 1010. In another example, the controller 1060 could be a hard-wired function wherein dedicated logic and switching elements control the primary regulator 1010. In yet another example, a combination of programmed elements and circuit logic elements could cooperate to perform the operation of the controller 1060.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
   a monitoring function to monitor control parameters of a wall adapter or USB input source which has variable power limits that supplies power to a wireless power transmitter to determine that amount of power the input source can deliver to the wireless power transmitter, wherein the wireless power transmitter operates with a wireless power receiver to supply a charging current to a load; and
   a controller in the transmitter configured to receive the control parameters from the monitoring function and to control an adjustable operating point for the wireless power transmitter which controls the charging current delivered to the load via the wireless power receiver to maintain power drawn from the input source within a predetermined range, wherein the controller commands a reduced power operating point for the wireless power transmitter when the input source to the wireless power transmitter is measured below a predetermined threshold, wherein the wireless transfer system automatically dynamically adjusts a receiver load line so that the input source does not shut down and the transmitter can still deliver power to the receiver wirelessly when the amount of power supplied by the input source is below the predetermined threshold.

2. The system of claim 1, wherein the control parameters include at least one of an input voltage level, an input current level, a switching frequency for the primary regulator, a temperature input, and a control input indicating a low power condition, wherein the control parameters are utilized by the controller to adjust the operating point of the wireless power transmitter.

3. The system of claim 2, wherein the feedback is communicated from the wireless power receiver to the controller as a modulated signal indicating load requirements of the load.

4. The system of claim 3, wherein the controller sets a not-to-exceed operating point based upon detecting a low power condition from the input source and based upon the feedback received from the wireless power receiver.

5. The system of claim 4, wherein the controller sets the not-to-exceed operating point to provide a power safety margin for the wireless power transmitter, wherein the power safety margin is determined as a difference between a current operating point and the not-to exceed operating point.

6. The system of claim 5, wherein the controller sets an operating frequency above a switching frequency that is detected at the not-to exceed operating point.

7. The system of claim 5, wherein the controller sets an operating voltage or current above a voltage or current that is detected at the not-to exceed operating point.

8. The system of claim 5, wherein the controller sets a secondary set point when the not-to-exceed operating point is reached.

9. The system of claim 8, wherein the secondary set point is employed to temporarily control an input voltage or current to a threshold that is greater than the not-to-exceed operating point.

10. The system of claim 5, wherein an output indicator including at least one of a light output and a sound frequency is energized by the controller to indicate that the controller is in a low power control mode.

11. The system of claim 1, wherein the controller employs a temporary low power mode during temporary increases in load charging current.

12. A method comprising:
monitoring a control parameter, via a processor, for an external variable wall adapter or USB input power source that supplies variable amounts of power in a wireless power transfer system;
measuring, by the processor, input power capabilities of the external variable input power source by comparing the control parameter to a threshold; and
automatically dynamically adjusting a power set point for a transmitter of the wireless power transfer system to adjust a receiver load line, by the processor, based on the measured input power capabilities of the variable external input power source, wherein the power set point is reduced when the variable input power source is determined to have limited power capabilities, wherein the variable power source does not shut down and power can still be delivered to the receiver when the amount of power supplies by the input source is below the predetermined threshold.

13. The method of claim 12, further comprising monitoring at least one of an input voltage level, an input current level, a switching frequency, a temperature input, feedback communicated from a wireless power receiver, and a control input indicating a low power condition, wherein the control parameter is utilized by the controller to adjust the power set point of the wireless power transfer system.

14. The method of claim 12, further comprising communicating load requirements that are analyzed with the control parameter to adjust the power set point.

15. The method of claim 12, further comprising setting a not-to-exceed threshold that determines a maximum amount of power that can be delivered by the wireless power transfer system.

16. The method of claim 15, further comprising setting a secondary set point to provide an additional margin above the not-to-exceed threshold.

17. An integrated circuit comprising:
a controller configured to monitor control parameters from a wall adapter or USB input source having variable power limits to control an adjustable operating point for a transmitter in the wireless power system to control a charging current delivered to a load in order to maintain power drawn from the input source within a predetermined range, so that the variable input source does not shut down wherein the controller commands a reduced power operating point for the wireless power system when the input source is measured below the predetermined threshold;
an input circuit to provide the control parameters to the controller; and
a lower power circuit to indicate the input source has a reduced power delivery capacity, wherein the integrated circuit automatically dynamically adjusts a receiver load line so that the transmitter can still deliver power to the receiver when the amount of power supplied by the input source is below the predetermined threshold.

18. The integrated circuit of claim 17, wherein the input circuit is an analog to digital converter (ADC) that receives the control parameters that include at least one of a voltage sense, a current sense, a temperature sense, a low power sense, and a frequency sense.

19. The integrated circuit of claim 17, wherein the low power circuit monitors at least one of a sleep mode input and a reset input to indicate the reduced power delivery.

20. The integrated circuit of claim 17, further comprising at least one of a LED control to indicate low power conditions, a buzzer control to indicate alarm conditions, an a pulse width modulator (PWM) control to drive a primary regulator.

* * * * *